United States Patent [19]

DeRosa et al.

[11] Patent Number: 5,112,508
[45] Date of Patent: May 12, 1992

[54] VI IMPROVER, DISPERSANT, AND ANTIOXIDANT ADDITIVE AND LUBRICATING OIL COMPOSITION

[75] Inventors: Thomas F. DeRosa, Passaic, N.J.; Ronald W. Von Allmen, Glenham, N.Y.; Benjamin J. Kaufman, Hopewell Junction, N.Y.; Rosemary J. Jennejahn, Nelsonville, N.Y.

[73] Assignee: Texaco, Inc., White Plains, N.Y.

[21] Appl. No.: 587,135

[22] Filed: Sep. 24, 1990

Related U.S. Application Data

[63] Continuation-in-part of Ser. No. 516,376, Apr. 30, 1990, abandoned.

[51] Int. Cl.⁵ ........................................... C10M 149/06
[52] U.S. Cl. .............................. 252/51.5 A; 525/285; 525/301; 525/382
[58] Field of Search .................. 252/51.5 A; 525/285, 525/301, 382

[56] References Cited

U.S. PATENT DOCUMENTS 4,234,435  11/1980  Meinhardt et al. ............. 252/51.5 A
4,505,834  3/1985  Papay et al. .................. 252/51.5 A Primary Examiner—Prince Willis, Jr.
Assistant Examiner—E. McAvoy
Attorney, Agent, or Firm—Robert A. Kulason; Robert B. Burns; James J. O'Loughlin

[57] ABSTRACT

An additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin and from about 0 to 15 mole percent of said polyene having an average molecular weight ranging from about 5,000 to 500,000 which has been reacted with at least one olefinic carboxylic acid acylating agent to form one or more acylating reaction intermediates characterized by having a carboxylic acid acylating function within their structure and reacting said reaction intermediate with a hydrocarbon substituted or unsubstituted N-naphthylphenylenediamine and a lubricating oil composition containing same are provided.

24 Claims, No Drawings

VI IMPROVER, DISPERSANT, AND ANTIOXIDANT ADDITIVE AND LUBRICATING OIL COMPOSITION

BACKGROUND OF THE INVENTION

This application is a continuation-in-part of application Ser. No. 07/516,376, filed on Apr. 30, 1990.

This invention relates to a novel multifunctional lubricant additive which is a VI improver, a dispersant, and an antioxidant additive when employed in a lubricating oil composition.

DISCLOSURE STATEMENT

The art contains many disclosures on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this type of oil additive.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine, which reaction product is useful as a sludge and varnish control additive in lubricating oils.

U.S. Patent No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinyl-pyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a $C_3$ to $C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylenepropylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

U.S. Pat. No. 4,863,623 discloses a grafted ethylene-propylene copolymer or terpolymer which has been derivatized with an amino-aromatic polyamine compound, e.g., an N-phenylphenylenediamine and a lubricating oil containing same.

The disclosures in the foregoing patents which relate to VI improvers and dispersants for lubricating oils; namely, U.S. Pat. Nos. 3,522,180, 4,026,809, 4,089,794, 4,137,185, 4,144,181, 4,146,489, 4,320,019, 4,340,689, 4,357,250, 4,382,007, and 4,863,623 are incorporated herein by reference.

An object of this invention is to provide a novel derivatized graft copolymer composition.

Another object of the invention is to provide a multifunctional lubricant additive effective for imparting viscosity index, dispersancy, and antioxidant properties to a lubricating oil composition.

A further object is to provide a novel lubricating oil composition containing the graft copolymer additive of the invention as well as to provide concentrates of the novel additive of invention.

SUMMARY OF THE INVENTION

The novel reaction product of the invention comprises an ethylene copolymer or terpolymer of a $C_3$ to $C_{10}$ alpha-monoolefin and, optionally, a non-conjugated diene or triene on which has been grafted an ethylenically unsaturated carboxylic function which is then further derivatized with a hydrocarbyl substituted or unsubstituted N-naphthyl-phenylenediamine compound represented by the formula:

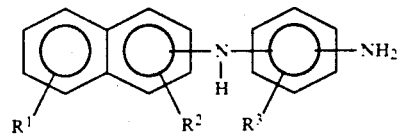

in which $R^1$, $R^2$ and $R^3$ are hydrogen or a linear or branched hydrocarbon radical containing from 1 to 10 carbon atoms that may be alkyl, alkenyl, alkoxyl, alkaryl, aralkyl, hydroxyalkyl, or aminoalkyl.

The novel lubricant of the invention comprises an oil of lubricating viscosity and an effective amount of the novel reaction product. The lubricating oil will be characterized by having dispersancy, viscosity index improver, and antioxidant properties.

Concentrates of the reaction product of the invention are also contemplated.

DETAILED DESCRIPTION OF THE INVENTION

The polymer or copolymer substrate employed in the novel additive of the invention may be prepared from ethylene and propylene, or it may be prepared from ethylene and a higher olefin within the range of $C_3$ to $C_{10}$ alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bi-cyclo compounds. Representative dienes include 1,4-hexadiene, 1,4-cyclohexadiene, dicyclopentadiene, 5-ethylidene-2- norbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro-iso-dicyclopentadiene, and 2-(2-methylene-4-methyl-3-pentenyl)-[2.2.1] bicyclo-5-heptene.

The polymerization reaction to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5 to 8 carbon atoms, with hexane being preferred. Aromatic hydrocarbons, preferably aromatic hydrocarbons having a single benzene nucleus, such as benzene, toluene, and the like; and saturated cyclic hydrocarbons having boiling point ranges approximating those of the straight chain paraffinic hydrocarbons, and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40-45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha-monoolefin copolymers may consist of from about 15 to 80 mole percent ethylene and from about 20 to 85 mole percent propylene or higher monoolefin with the preferred mole ratios being from about 30 to 75 mole percent ethylene and from about 25 to 75 mole percent of a $C_3$ to $C_{10}$ alpha-monoolefin.

Terpolymer variations of the foregoing polymers may contain from about 0.1 to 10 mole percent of a non-conjugated diene or triene.

The polymer substrate, that is, the ethylene copolymer or terpolymer, is an oil-soluble, substantially linear, rubbery material.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is next grafted onto the prescribed polymer backbone. These materials are attached to the polymer and contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid, and their monoesters.

The ethylenically unsaturated carboxylic acid material may be grafted onto the polymer backbone in a number of ways. It may be grafted onto the backbone by a thermal process known as the "ene" process or by grafting in solution or in solid form using a radical initiator. The free-radical induced grafting of ethylenically unsaturated carboxylic acid materials in solvents, such as benzene, is a preferred method. It is carried out at an elevated temperature in the range of about 100° C. to 250° C., preferably 120° C. to 190° C. and more preferably at 150° C. to 180° C., e.g., about 160° C., in a solvent, preferably a mineral lubricating oil solution containing, e.g., 1 to 50, preferably 5 to 30 weight percent, based on the initial total oil solution of the ethylene polymer and preferably under an inert environment.

The free-radical initiators which may be used are peroxides, hydroperoxides, and azo compounds and preferably those which have a boiling point greater than about 100° C. and decompose thermally within the grafting temperature range to provide free radicals. Representative of these free-radical initiators are azobutyronitrile and 2,5-dimethyl-hex-3-yne-2,5 bis-tertiary-butyl peroxide. The initiator is used in an amount of between about 0.005% and about 2% by weight based on the total weight of initial total oil solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted on molten rubber using rubber masticating or shearing equipment. The temperature of the molten material in this process may range from about 150° C. to 400° C.

Polymer substrates or interpolymers are available commercially. Particularly useful are those containing from about 40 to about 60 mole percent ethylene units, about 60 to about 40 mole percent propylene units. Examples are "Ortholeum 2052" and "PL-1256" available from E. I. duPont deNemours and Co. The former is a terpolymer containing about 48 mole percent ethylene units, 48 mole percent propylene units and 4 mole percent 1,4-hexadiene units, having an inherent viscosity of 1.35. The latter is a similar polymer with an inherent viscosity of 1.95. The viscosity average molecular weights of the two are on the order of 200,000 and 280,000, respectively.

The polymer intermediate possessing carboxylic acid acylating functions is reacted with a hydrocarbyl substituted or unsubstituted N-naphthyl-phenylenediamine represented by the formula:

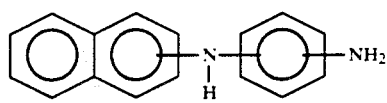

More specifically, these compounds may be represented by the formula:

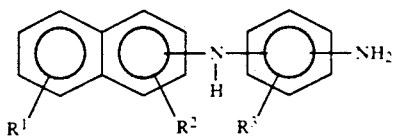

in which $R^1$, $R^2$ and $R^3$ are hydrogen or a linear or branched hydrocarbon radical containing from 1 to 10 carbon atoms that may be alkyl, alkenyl, alkoxyl, alkaryl, aralkyl, hydroxyalkyl, or aminoalkyl.

Specific N-naphthyl-phenylenediamines which may be employed include:
N-(1-naphthyl)-m-phenylenediamine,
N-(1-naphthyl)-p-phenylenediamine,
N-(2-naphthyl)-m-phenylenediamine, and
N-(2-naphthyl)-p-phenylenediamine.

The reaction between the polymer substrate intermediate having grafted thereon carboxylic acid acylating function and the prescribed N-naphthyl-phenylenediamine compound is conducted by heating a solution of the polymer substrate under inert conditions and then adding the N-naphthyl-phenylenediamine compound to the heated solution generally with mixing to effect the reaction. It is convenient to employ an oil solution of the polymer substrate heated to 140° C. to 175° C. while maintaining the solution under a nitrogen blanket. The N-phenyl-phenylenediamine compound is added to this solution and the reaction is effected under the noted conditions.

The following examples illustrate the preparation of the novel reaction product additive of the invention.

EXAMPLE I 60 grams of a solid maleic anhydride graft polymer (rubber) in which the polymer substrate consisted of about 58 mole percent ethylene and 42 mole percent propylene having an average molecular weight of 80,000 on which has been grafted 1.5 weight percent of maleic anhydride was dissolved in 485 grams of solvent neutral oil at 160° C. with mechanical stirring while the mixture was maintained under a nitrogen blanket. After the rubber polymer had dissqlved, mixing was continued for an additional hour at 160° C.

2.35 grams of N-(1-naphthyl)-m-phenylenediamine was added to the oil solution of the polymer and a reaction effected over four hours at 160° C. under nitrogen. The reaction mixture containing the derivatized graft polymer was then cooled and filtered.

EXAMPLE II

N-(1-naphthyl)-p-phenylenediamine is substituted for N-(1-naphthyl)-m-phenylenediamine in Example I.

EXAMPLE III

N-(2-naphthyl)-p-phenylenediamine is substituted for N-(1-naphthyl)-m-phenylenediamine in Example I.

EXAMPLE IV

N-(2-naphthyl)-m-phenylenediamine is substituted for N-(1-naphthyl)-m-phenylenediamine in Example I.

EXAMPLE V

A mixture consisting of a 1:1 weight ratio of N-(1-naphthyl)-p-phenylenediamine and N-(1-naphthyl)-m-phenylenediamine is substituted in Example I.

EXAMPLE VI

A mixture consisting of a weight ratio of N-(1-naphthyl)-p-phenylenediamine and N-(2-naphthyl)-p-phenylenediamine is substituted in Example I.

EXAMPLE VII

A mixture consisting of a weight ratio of N-(1-naphthyl)-p-phenylenediamine and N-(2-naphthyl)-m-phenylenediamine is substituted in Example I.

EXAMPLE VIII

A mixture consisting of a 1:1 weight ratio of N-(2-naphthyl)-p-phenylenediamine and N-(2-naphthyl)-m-phenylenediamine is substituted in Example I.

EXAMPLE IX

A mixture consisting of a 1:1:1 weight ratio of N-(1-naphthyl)-p-phenylenediamine, N-(1-naphthyl)-m-phenylenediamine, and N-(2-naphthyl)-p-phenylenediamine is substituted in Example I.

EXAMPLE X

A mixture consisting of a 1:1 weight ratio of N-(1-naphthyl)-p-phenylenediamine, N-(1-naphthyl)-m-phenylenediamine, and N-(2-naphthyl)-m-phenylenediamine is substituted in Example I.

EXAMPLE XI

A mixture consisting of a 1:1:1 weight ratio of N-(1-naphthyl)-m-phenylenediamine, N-(1-naphthyl)-p-phenylenediamine, and N-(2-naphthyl)-m-phenylenediamine is substituted in Example I.

EXAMPLE XII

A mixture consisting of a 1:1:1 weight ratio of N-(1-naphthyl)-p-phenylenediamine, N-(1-naphthyl)-m-phenylene-diamine,N-(2-naphthyl)-p-phenylenediamine,andN-(2-naphthyl)-m-phenylenediamine is substituted in I.

The novel graft and derivatized polymer of the invention is useful as an additive for lubricating oils. The additive is a multifunctional additive for lubricants being effective to provide dispersancy, viscosity index improvement, and antioxidant properties to lubricating oils. It can be employed in a variety of oils of lubricating viscosity, including natural and synthetic lubricating oils and mixtures thereof. The novel additive can be employed in crankcase lubricating oils for spark-ignited and compression-ignited internal combustion engines. The additive can also be used in lubricants for gas engines or turbines, automatic transmission fluids, gear lubricants, metal-working lubricants, hydraulic fluids, and other lubricating oil and grease compositions. Its use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 15 weight percent. A preferred concentration range for the additive is from about 1 to 10 weight percent.

Oil concentrates of the additives may contain from about 1 to 50 weight percent of the additive reaction product.

The novel reaction product of the invention may be employed in lubricant compositions together with conventional lubricant additives. Such additives may include additional dispersants, detergents, antioxidants, pour point depressants, anti-wear agents, and the like.

The novel additive reaction product of the invention was tested for its effectiveness as a dispersant and as an antioxidant in a formulated lubricating oil composition. In all of the examples, the polymer substrate was similar, comprising about 58 mole percent ethylene, 42 mole percent propylene having an average molecular weight of about 80,000. The base lubricating oil used in the dispersancy test was a typical formulated lubricating oil as represented by the values set forth in Table I.

TABLE I

| Component | Parts by Weight |
|---|---|
| Solvent Neutral Oil A | 75.25 |
| Solvent Neutral Oil B | 21.64 |
| Zinc Dialkyldithiophosphate | 1.22 |
| 4,4 Dinonyldiphenylamine | .39 |
| Overbased Magnesium Sulfonate | 1.50 |
| Silicone Antifoamant | 150 ppm |
| Product | 10 |
| Analyses | |
| Viscosity Kin 40° C. CS | 30.4 |
| Viscosity Kin 100° C. CS | 5.33 |
| Pour Point, F | −10 |
| Ash Sulfated, % D874 | 0.88 |
| Phosphorus, % X-ray | 0.12 |
| Sulfur, % X-ray | 0.32 |
| Zinc, % X-ray | 0.13 |

Oil A had a sp. gr. 60/60° F. of 0.858–0.868; Vis. 100° F. 123–133; Pour Point 0° F. Oil B had a sp. gr. 60/60° F. of 0.871–0.887; Vis. 100° F. 325–350; Pour Point −10° F. Zinc salt is a salt of mixed alcohols-isopropanol and $P_2S_5$ product as described in U.S. Pat. No. 3,292,181. The overbased magnesium sulfonate had a TBN of 395 and is a salt of branched $C_{20}$ to $C_{40}$ monoalkyl benzene sulfuric acid (MW 530–540) together with about 10% magnesium carbonate, 14% magnesium hydroxide, and 4% magnesium sulfate.

The dispersant properties of the additive-containing oil are determined in the Bench VC Dispersancy Test (BVCT). Dispercancy of a lubricating oil is determined relative to three references which are the results from three standard blends tested along with the unknown. The test additives were blended into a formulated oil containing no dispersant. The additive reaction product was employed in the oil at a concentration of 1.20 weight percent polymer solution. The numerical value of the test results decreases with an increase in effectiveness.

TABLE II

| | BENCH VC DISPERSANCY TEST | |
|---|---|---|
| Run | Additive | Result |
| 1 | Comparison[1] | 93 |
| 2 | Comparison[2] | 97 |
| 3 | Comparison[3] | 28 |
| 4 | Example I | 35 |
| 5 | Example II | 37 |
| 6 | Commercial N-vinylpyrrolidone grafted dispersant olefin | 29 |

TABLE II-continued

| | BENCH VC DISPERSANCY TEST | |
|---|---|---|
| Run | Additive | Result |
| | copolymer | |

[1]Lubricating oil containing unmodified ethylene-propylene copolymer
[2]Lubricating oil containing ethylene-propylene copolymer with grafted maleic anhydride
[3]Lubricating oil containing N-phenyl-phenylenediamine derivatized grafted ethylene-propylene copolymer The test results show that the reaction product of the invention was a highly effective dispersant in a lubricating oil.

The antioxidant properties of the novel reaction product in a lubricating oil was determined in the Bench Oxidation Test. In this test, 1.5 weight percent of the additive reaction product is blended into solvent neutral oil (S.U.S. at 100° F. of 130). The mixture is continuously stirred while being heated accompanied by bubbling with air. Samples are withdrawn periodically for analysis by Differential Infrared Absorption (DIR) to observe changes in the intensity of the carboxyl vibration band at $1710^{cm-1}$. A low carboxyl vibration band intensity indicates higher thermal-oxidative stability of the sample.

TABLE III

| | BENCH OXIDATION TEST | |
|---|---|---|
| Run | Additive | Result |
| 1 | Comparison[3] | 0 |
| 2 | Example I | 1.4 |
| 3 | Example II | 1.8 |
| 4 | Comparison[1] | >20 |
| 5 | Comparison[2] | >20 |

[1]Lubricating oil containing unmodified ethylene-propylene copolymer
[2]Lubricating oil containing ethylene-propylene copolymer with grafted maleic anhydride
[3]Lubricating oil containing a grafted ethylene-propylene copolymer derivatized with N-phenyl-phenylenediamine The test results for Examples I and II demonstrate the substantial effectiveness in antioxidant properties due to incorporation of the novel reaction product of the invention in an oil composition as compared to the results obtained from a known commercial additive.

What is claimed is:

1. An additive composition prepared by the steps comprising:

(a) reacting a polymer prepared from ethylene and at least one $C_3$ to $C_{10}$ alpha-monoolefin and, optionally, a polyene selected from non-conjugated dienes and trienes with at least one olefinic carboxylic acid acylating agent to form one or more acylating reaction intermediates characterized by having a carboxylic acid acylating function within their structure and comprising from about 15 to 80 mole percent of ethylene, from about 20 to 85 mole percent of said $C_3$ to $C_{20}$ alpha-monoolefin, and from about 0 to 15 mole percent of said polyene, and (b) reacting said reaction intermediate in (a) with a hydrocarbon substituted or unsubstituted N-naphthylphenylenediamine represented by the formula:

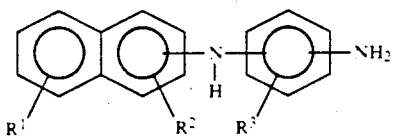

in which $R^1$, $R^2$ and $R^3$ are hydrogen or a linear or branched hydrocarbon radical containing from 1 to 10 carbon atoms that may be alkyl, alkenyl, alkoxyl, alkaryl, aralkyl, hydroxyalkyl, or aminoalkyl.

2. A composition according to claim 1 in which said polymer has an average molecular weight from about 25,000 to 250,000.

3. A composition according to claim 1 in which said polymer has an average molecular weight from about 50,000 to 150,000.

4. A composition according to claim 1 in which said polymer comprises from about 25 to 55 mole percent ethylene and from about 25 to 75 mole percent of a $C_3$ to $C_8$ alpha-monoolefin.

5. A composition according to claim 1 in which said polymer comprises from about 25 to 55 mole percent ethylene and from about 45 to 75 mole percent of propylene.

6. A composition according to claim 4 which contains from about 0.1 to 10 mole percent of a polyene.

7. A composition according to claim 1 in which said olefinic carboxylic acid acylating agent is maleic anhydride.

8. A composition according to claim 1 in which said olefinic carboxylic acid acylating agent is itaconic anhydride.

9. A composition according to claim 1 in which said N-naphthyl-phenylenediamine is N-(1-naphthyl)-m-phenylenediamine.

10. A composition according to claim 1 in which said N-naphthyl-phenylenediamine is N-(1-naphthyl)-p-phenylenediamine.

11. A composition according to claim 1 in which said N-naphthyl-phenylenediamine is N-(2-naphthyl)-p-phenylenediamine.

12. A composition according to claim 1 in which said N-naphthyl-phenylenediamine is (N-(2-naphthyl)-m-phenylenediamine.

13. A lubricating oil composition comprising a major amount of an oil of lubricating viscosity and a minor amount effective to impart viscosity index dispersancy, and antioxidant properties to said oil of an additive composition prepared by the steps comprising:

(a) reacting a polymer prepared from ethylene and at least one $C_3$ to $C_{10}$ alpha-monoolefin and, optionally, a polyene selected from non-conjugated dienes and trienes having an average molecular weight ranging from about 10,000 to 500,000 with at least one olefinic carboxylic acid acylating agent to form one or more acylating reaction intermediates characterized by having a carboxylic acid acylating function within their structure and comprising from about 15 to 80 mole percent ethylene, about 20 to 85 mole percent of said $C_3$ to $C_{20}$ alphamonoolefin and from about 0 to 15 mole percent of said polyene, and (b) reacting said reaction intermediate in (a) with a hydrocarbyl substituted or unsubstituted N-naphthylphenylenediamine represented by the formula:

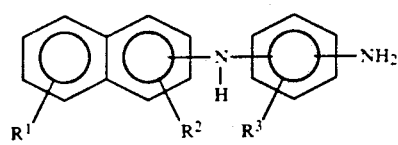

in which $R^1$, $R^2$ and $R^3$ are hydrogen or a linear or branched hydrocarbon radical containing from 1 to 10 carbon atoms that may be alkyl, alkenyl, alkoxyl, alkaryl, aralkyl, hydroxyalkyl, or aminoalkyl.

14. A lubricating oil composition according to claim 13 containing from about 0.1 to 15 weight percent of said additive composition based on the total weight of the oil composition.

15. A lubricating oil composition according to claim 13 containing from about 1 to 7.5 weight percent of said additive composition based on the total weight of the oil composition.

16. An additive composition according to claim 1 in which said N-naphthyl-phenylenediamine is N-(1-naphthyl-m-phenylenediamine.

17. An additive composition according to claim 1 in which said N-naphthyl-phenylenediamine is N-(1-naphthyl-p-phenylenediamine.

18. An additive composition according to claim 1 in which said N-naphthyl-phenylenediamineisN-(2-naphthyl)-p-phenylenediamine.

19. An additive composition according to claim 1 in which said N-naphthyl-phenylenediamineisN-(2-naphthyl)-m-phenylenediamine.

20. A lubricating oil composition according to claim 13 in which said N-naphthyl-phenylenediamine is N-(1-naphthyl-m-phenylenediamine.

21. A lubricating oil composition according to claim 13 in which said N-naphthyl-phenylenediamine is N-(1-naphthyl-p-phenylenediamine.

22. A lubricating oil composition according to claim 13 in which said N-naphthyl-phenylenediamine is N-(2-naphthyl-m-phenylenediamine.

23. A lubricating oil composition according to claim 13 in which said N-naphthyl-phenylenediamine is N-(2-naphthyl-p-phenylenediamine.

24. A concentrate for a lubricating oil comprising a diluent oil of lubricant viscosity and from about 1 to 20 weight percent of the additive composition of claim 1 based on the total weight of the concentrate.

* * * * *